Figure 3:
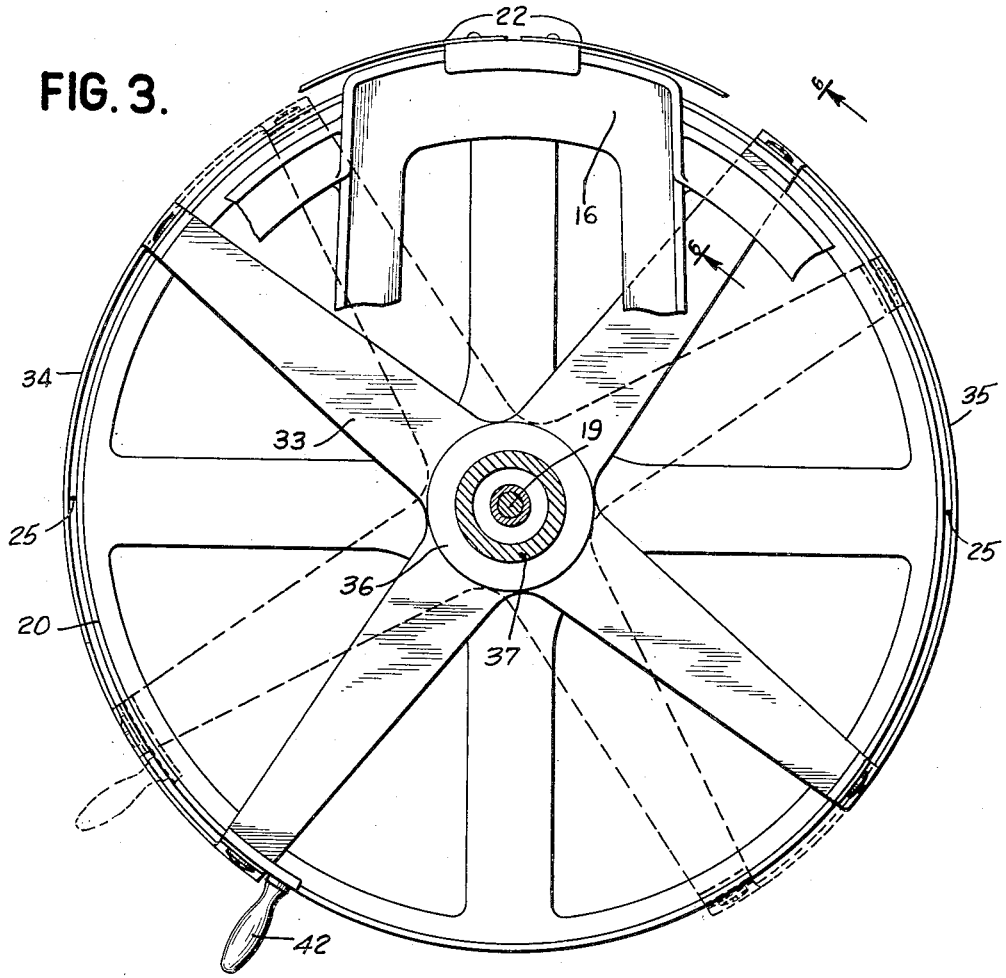

Oct. 30, 1934.  J. S. OGSBURY  1,978,910
SCALE
Filed May 19, 1933  3 Sheets-Sheet 1
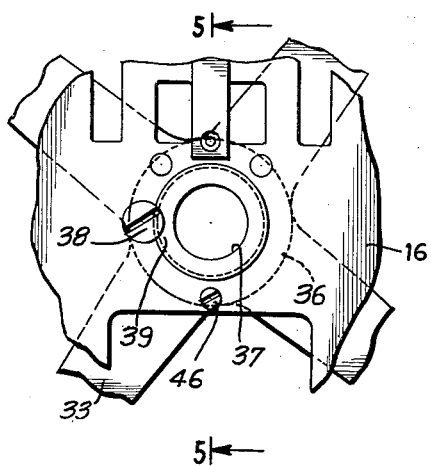
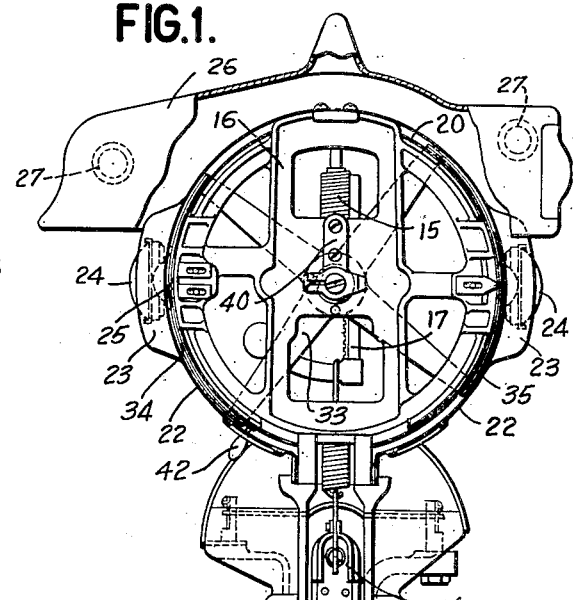
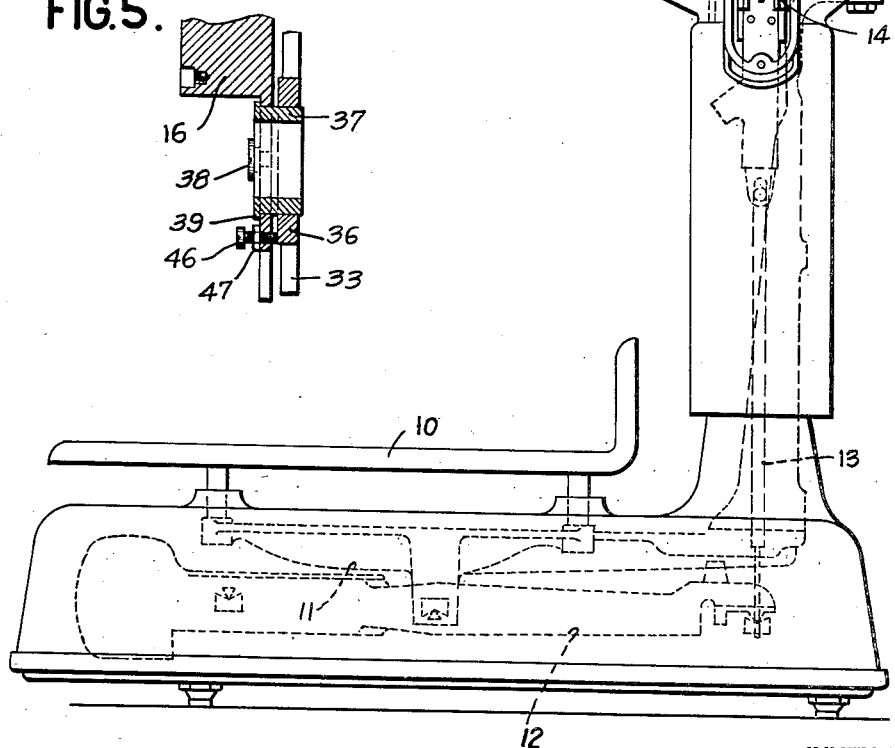
INVENTOR-
James S. Ogsbury
BY
ATTORNEY

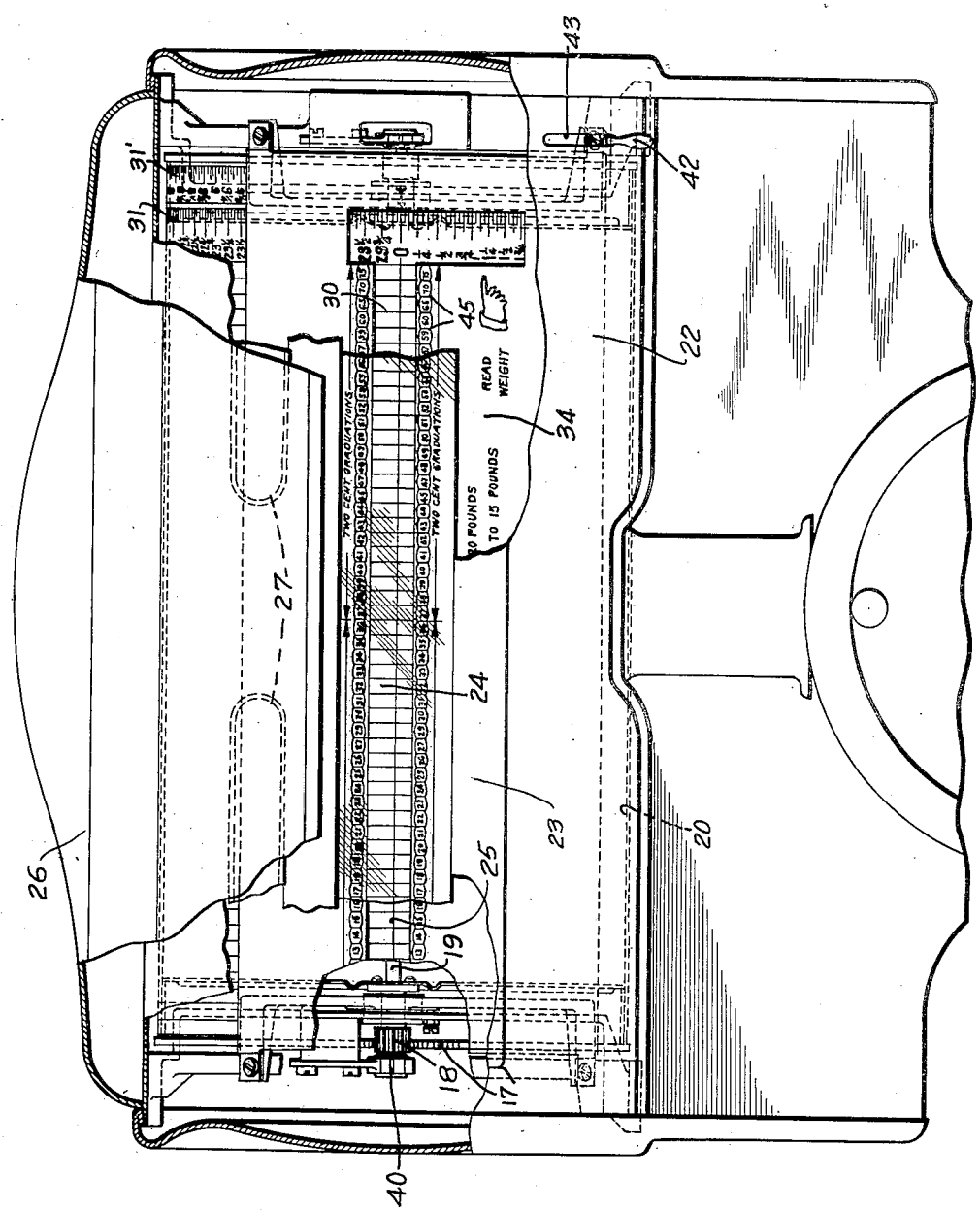

Oct. 30, 1934.    J. S. OGSBURY    1,978,910
SCALE
Filed May 19, 1933    3 Sheets-Sheet 3

INVENTOR
James S. Ogsbury
BY
[signature]
ATTORNEY

Patented Oct. 30, 1934

1,978,910

UNITED STATES PATENT OFFICE 1,978,910

SCALE

James S. Ogsbury, Dayton, Ohio, assignor, by mesne assignments, to International Business Machines Corporation, New York, N. Y., a corporation of New York Application May 19, 1933, Serial No. 671,834

7 Claims. (Cl. 265—29)

This case relates to weighing and computing scales of the drum type and particularly to one known as the Dayton customer read drum scale.

In this scale, the load rotates a drum or cylinder chart having opposite circumferential halves marked with duplicate sets of price indications, one set for observation by the customer and the other for observation by the merchant. After rotation of the chart beyond its price range, the customer's indications would appear inverted relative to the merchant and the merchant's indications would appear inverted relative to the customer thus causing confusion and error.

The object of the present invention is to provide a simplified, improved, and novel mechanism for preventing the merchant or customer from reading inverted indications on the drum chart.

Another object is to provide the shutter with unit prices or rates alined with the price columns of each set of indications on the chart.

Various other objects and advantages of my invention will be obvious from the following particular description of one form of mechanism embodying the invention or from an inspection of the accompanying drawings, and the invention also constitutes certain new and novel features of the construction and combination of parts hereinafter set forth and claimed.

Figure 7:
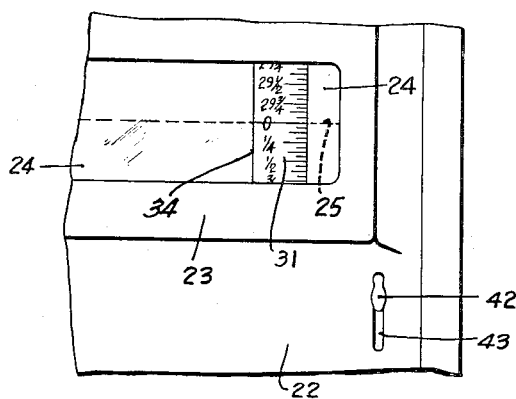
Figure 6:
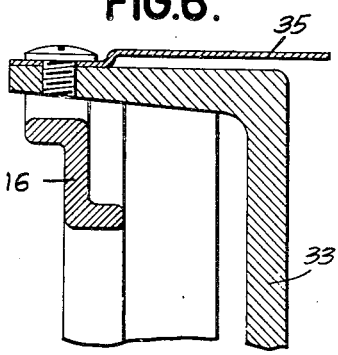

In the drawings:

Fig. 1 is a side view of the scale with the end rings of the upper casing removed and the illuminating hood partly broken away, Fig. 2 is a front view from the merchant's side of the upper part of the scale, with part of the casing removed and sectioned to show the interior, Fig. 3 is an enlarged end view of the shutter mechanism and chart, Fig. 4 is a detail outside end view of the shutter mounting, Fig. 5 is a section on line 5—5 of Fig. 4, Fig. 6 is a section along line 6—6 of Fig. 3, and Fig. 7 is a detail of the merchant's side of the scale with the shutter in closed position.

The scale comprises platform 10 mounted by means of spider 11 on base lever 12 connected through draft rod 13 to the draw bar 14 which operates the springs 15 suspended from end frames 16 and racks 17. The racks drive pinions 18 on shaft 19 carrying cylinder chart 20. The chart is enclosed by similar casing halves 22, each having an expanded portion 23 in which is held a cylinder type magnifying lens 24 through which the chart is read against suitable zero lines 25.

For further particulars of the weighing mechanism of the above construction, reference may be had to Patent 1,690,258.

An illuminating head 26 carried by the frame is provided with lamps 27 to illuminate the chart when a load is placed on the platform, in a manner well-known to the art.

The scale chart has duplicate sets of price columns 30, each extending about half-way around the chart, one set being adapted for observation by the customer and the other for observation by the merchant. The chart thus provides value indications through half the scale range.

If, as in the present instance, the scale has a total weighing capacity of thirty pounds, the values of articles will be given by the chart only during the movement of the chart through a fifteen pound range. The subsequent operation of the scale through the fifteen to thirty pound range will provide only weight indications from weight columns 31 and 31' of the chart respectively to merchant and customer. During this latter range, the customer's and merchant's value indications would appear inverted to each other. This would cause error and confusion on the part of the customer and would also give a dishonest merchant an opportunity to make an incorrect value reading. To prevent the customer or merchant from reading each other's inverted value columns 30, after the scale passes its price range, the merchant operates a shutter mechanism which conceals the value columns of the chart at opposite sides of the scale but leaves exposed the merchant's weight column 31 and the customer's weight column 31'.

This shutter mechanism comprises spider frames 33, one at each end of the scale, to which are fastened masks or shutters 34 and 35, respectively at the merchant's and customer's sides of the scale. The spider frames comprise hubs 36 rotatably mounted on sleeves 37, each sleeve being held against rotation and axial displacement within a hole in the adjacent end frame 16 by means of a screw 38 which clamps the sleeve flange 39 against the side of the end frame.

The drum chart shaft 19 passes through the sleeves 37 and is journaled in bearings (not shown) carried by brackets 40 secured to the end frames 16 at the sides opposite those at which the shutter spider frames 33 are located. To the right hand shutter frame (as viewed in Fig. 2) and at the merchant's side of the scale is secured a handle 42, passing through a slot 43 in the casing half 22. When the merchant moves handle 42 from lower full line position to upper dotted line position in Fig. 3, he rotates the shutter device to move the shutter 34 upwardly and shutter 35 downwardly to cover the value parts of the chart, at the merchant's and customer's sides of the scale, respectively. By moving the handle down from the upper to the lower end of the slot 43, the shutters are returned to inactive, chart exposing positions.

Each of shutters 34 and 35 has marked thereon the unit prices or rates 45, each rate corresponding to a different value column 30. In order to aline the rates with their respective columns, a screw 46 is threaded into each end frame 16 below the adjacent sleeve 37 to engage the side of the hub 36 of the shutter frame mounted on the sleeve. By adjusting the screws 46, the shutter frame may be moved axially on the sleeves 36 to properly aline the rates 45 with their respective columns. The two screws 46 acting on the opposite hubs 36 of the shutter frame prevent shifting of the spider frame axially of the chart after the frame has been adjusted.

The contact of the screws with the hubs 36 of the shutter frame also imposes frictional resistance to rotatable movement of the chart from adjusted position. Lock nuts 47 hold screws 46 in adjusted positions.

A brief summary of the operation of the scale follows:

When an article is placed by the merchant on platform 10, the latter causes base lever 12 to move rod 13 and draw bar 14 downwardly, thus extending weighing springs 15 and actuating racks 17 to rotate pinions 18 on the drum chart shaft 19. The chart 20 is thus rotated to a position corresponding to the weight of the article which is indicated to both the merchant and customer by their respective weight columns 31 and 31'. If the article sells at 26 cents a pound and weighs less than fifteen pounds, the total price of the article will be indicated to customer and merchant in the duplicate value columns 30 of the chart which are in line with the number 26 in the row of unit prices 45 in the shutters 34 and 35, now in chart exposing position. When the article weighs more than fifteen pounds, the merchant moves handle 42 upwardly to the top of slot 43 thus moving shutters 34 and 35 in front of the chart value columns 30 at opposite sides of the scale, thus concealing these columns from view through the merchant's and customer's sight windows. The weight of the article above fifteen pounds is then indicated to customer and merchant by weight columns 31 and 31'.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the following scope.

What is claimed is:

1. A scale having a load support, counterbalancing and indicating means operated by the support, the indicating means comprising a rotatable drum chart having circumferential columns of indications each based on a different unit rate, a housing for the chart having a sight window through which the indications are visible, a shutter device movable relative to the housing into alternative positions, one for exposing the indications and the other for concealing the indications at the sight window, and a series of unit rate indications corresponding to the different columns carried by the shutter and visible at the sight window when the shutter is in chart exposing position, and means for shifting the shutter device in a direction parallel to the axis of the chart for alining the unit rate indications with their respective chart columns.

2. A scale having a load support, counterbalancing and indicating means operated by the support, the indicating means comprising a rotatable drum chart having circumferential columns of indications each based on a different unit rate, a housing for the chart having a sight window through which the indications are visible, a shutter device movable relative to the housing into alternative positions, one for exposing the indications and the other for concealing the indications at the sight window, and a series of unit rate indications corresponding to the different columns carried by the shutter and visible at the sight window when the shutter is in chart exposing position, and means for shifting the shutter device in a direction parallel to the axis of the chart for alining the unit rate indications with their respective columns, said means also frictionally engaging the shutter device for retaining it frictionally in either of its positions.

3. A scale having a load support, counterbalancing and indicating means operated thereby, the indicating means comprising a rotatable drum chart having duplicate sets of indications arranged in circumferential columns, one set being disposed on one semi-circular half of the chart and the other set being disposed on the opposite semi-circular half, a shaft carrying the chart, a housing having sight windows, one at each side of the scale, through each of which one of the sets of indications is readable in upright position and through which the other set appears inverted, a frame inside the housing for rotatably mounting the chart shaft, a shutter device having oppositely disposed, opaque masking elements extending in a direction parallel to the chart shaft, each for concealing the indications at one of the sight windows to prevent the appearance of inverted indications therethrough after the chart moves through about half its full range of movement, a supporting web for said elements, means carried by said frame for mounting the web for rotation about an axis substantially coincident with the axis of rotation of the chart, and means for moving the shutter device on its mounting to move both elements in the same direction alternatively clockwise or anticlockwise to alternatively position both shutter elements for concealing or exposing the chart indications at the sight window.

4. The scale as defined in claim 3, said mounting means for the web comprising a sleeve carried by said frame through which the chart shaft freely passes, and said web comprising a hub rotatably mounted on said sleeve.

5. A weighing and computing scale having a load support, counterbalancing and indicating means operated by the support, the indicating means comprising a drum chart having duplicate columns of weight indications, each column extending substantially the full circumferential range of the chart and having its indications inverted relative to the indications of the other column, the chart also having parallel to the weight columns duplicate sets of columns of computations, each column based on a different basic factor, each set of computations extending about half the circumferential range of the chart, a housing for the chart having sight windows, one at each side of the scale for exposing one of the weight columns with the indications in upright position throughout the full movement of the chart and for exposing one set of computations in upright position through about half the full movement of the chart, a shutter device having opaque masking elements at diametrically opposite sides of the chart each for moving into position at one of the sight windows to conceal the computation columns after the chart has completed half its full movement and leaving the weight column exposed, webs extending radially of the chart, one outside each end of the chart for carrying said masking elements between them, a frame inside the housing for rotatably mounting each web, and a handle affixed to the shutter device and extending exteriorly through an opening in the housing and operable from one side of the scale for moving the shutter device into exposing or concealing position with respect to the chart computation columns.

6. The scale as defined in claim 5, each masking element bearing a row of basic factor indications adjacent the computation columns to indicate the basic factor according to which the computation columns have been calculated.

7. The scale as defined in claim 5, each masking element bearing a row of basic factor indications to indicate the basic factors according to which the corresponding computation columns have been calculated, and means for adjusting the shutter device in a direction parallel to the chart axis to aline the basic factor indications with their respective computation columns.

JAMES S. OGSBURY.